US008924536B1

(12) United States Patent
Barbeau et al.

(10) Patent No.: US 8,924,536 B1
(45) Date of Patent: Dec. 30, 2014

(54) DISTRIBUTED AND DECENTRALIZED LOCATION AWARE ARCHITECTURE

(75) Inventors: Sean J. Barbeau, Tampa, FL (US);
Philip L. Winters, Tampa, FL (US);
Rafael Perez, Temple Terrace, FL (US);
Nevine Georggi, Valrico, FL (US);
Miguel Labrador, Tampa, FL (US);
Alfredo Perez, Tampa, FL (US)

(73) Assignee: University of South Florida, Tampa, FL (US)

(*) Notice: Subject to any disclaimer, the term of this patent is extended or adjusted under 35 U.S.C. 154(b) by 423 days.

(21) Appl. No.: 12/843,143

(22) Filed: Jul. 26, 2010

Related U.S. Application Data

(60) Provisional application No. 61/228,376, filed on Jul. 24, 2009.

(51) Int. Cl.
*G06F 15/16* (2006.01)
*G06F 15/177* (2006.01)
*G06F 15/173* (2006.01)

(52) U.S. Cl.
USPC ........... 709/224; 709/223; 709/225; 709/226; 709/217; 709/218; 709/219; 709/220; 709/221

(58) Field of Classification Search
CPC ..................................................... H04L 67/18
USPC ......... 709/224, 223, 225, 226, 217, 218, 219, 709/220, 221
See application file for complete search history.

(56) References Cited

U.S. PATENT DOCUMENTS

| 2004/0205158 | A1* | 10/2004 | Hsu ............................... 709/218 |
| 2004/0224696 | A1* | 11/2004 | Korneluk et al. ............ 455/449 |
| 2005/0272421 | A1* | 12/2005 | Vare et al. .................. 455/432.1 |
| 2006/0046739 | A1* | 3/2006 | Blosco et al. ................. 455/453 |
| 2006/0198344 | A1* | 9/2006 | Teague et al. ................. 370/337 |
| 2007/0176771 | A1* | 8/2007 | Doyle ...................... 340/539.13 |
| 2007/0218914 | A1* | 9/2007 | Mori et al. .................... 455/450 |
| 2008/0200186 | A1* | 8/2008 | Vare et al. ................... 455/456.2 |
| 2008/0200187 | A1* | 8/2008 | Lin et al. .................... 455/456.6 |
| 2009/0131021 | A1* | 5/2009 | Vogedes et al. ............. 455/412.1 |
| 2009/0247114 | A1* | 10/2009 | Sennett et al. ............. 455/404.1 |
| 2012/0122496 | A1* | 5/2012 | Teague et al. ................ 455/458 |

OTHER PUBLICATIONS

CENS Urban Sensing, http://urban.cens.ucla.edu/projects/, accessed Oct. 20, 2010.

(Continued)

*Primary Examiner* — Rupal Dharia
*Assistant Examiner* — Mohammed Ahmed
(74) *Attorney, Agent, or Firm* — Molly Sauter; Courtney Dunn; Smith & Hopen, P.A.

(57) ABSTRACT

Provided is a distributed and decentralized location-aware system. The system includes a number of peers, each in communication with other peers and adapted to communicate PING, PONG, and ALERT messages. Each of the messages has a header that includes location information.
Also provided is a method of communication between two peers in the system. In addition, the present invention includes a method of rendering the system. In the method, a communication link between an electronic map and a number of peers is provided. The location information and the covering distance of each of the peers is obtained and used to plot the location and render the covering distance of each peer on the electric map. A communication link between an electronic control device and the electronic map is also provided.

11 Claims, 1 Drawing Sheet

(56) References Cited

OTHER PUBLICATIONS

Chong et al., Sensor Networks: Evolution, Opportunities, and Challenges, Proceedings of the IEEE, 2003, vol. 91, No. 8, pp. 1247-1256.

Kahn et al., Next Century Challenges: Mobile Networking for "Smart Dust", Proceedings of the 5th Annual ACM/IEEE International Conference on Mobile Computing and Networking, 1999, pp. 1-8.

Yick et al., Wireless Sensor Network Survey, Computer Networks, Apr. 14, 2008, vol. 52, pp. 2292-2330.

Barbeau et al., A General Architecture in Support of Interactive, Multimedia, Location-Based Mobile Applications, IEEE Communications Magazine, 2006, pp. 156-163.

Kupper et al., TraX: A Device-Centric Middleware Framework for Location-Based Services, IEEE Communications Magazine, 2006, pp. 114-120.

Eisenman et al., MetroSense Project: People-Centric Sensing at Scale, Proceedings of 4th ACM Conference on Embedded Networked Sensor Systems, 2006, pp. 1-6.

Burke et al., Participatory Sensing, Proceedings of 4th ACM Conference on Embedded Networked Sensor Systems, 2006, pp. 1-5.

Microsoft Networked Embedded Computer Research Group, http://research.microsoft.com/en-us/groups/nec/, accessed Aug. 23, 2010.

MIT Senseable City Lab, http://senseable.mit.edu/, accessed Oct. 20, 2010.

Cambridge Mobile Urban Sensing, http://www.escience.cam.ac.uk/mobiledata/, accessed Oct. 20, 2010.

Kaneko et al., A Location-Based Peer-to-Peer Network for Context-Aware Services in a Ubiquitous Environment, Proceedings of the 2005 Symposium on Applications and the Internet Workshops, 2005, pp. 1-4.

Teranishi et al., A Geographical Observation System Based on P2P Agents, Sixth Annual IEEE International Conference on Pervasive Computing and Communications, Mar. 17, 2008, pp. 615-620.

Wei et al., GNet: A Peer-to-Peer Protocol for Internet Scale Location-Based Applications, Proceedings of the Second International Conference on Embedded Software and Systems, 2005, pp. 1-8.

Microsoft Research Sense Web, http://research.microsoft.com/en-us/projects/senseweb/default.aspx, accessed Oct. 26, 2010.

* cited by examiner

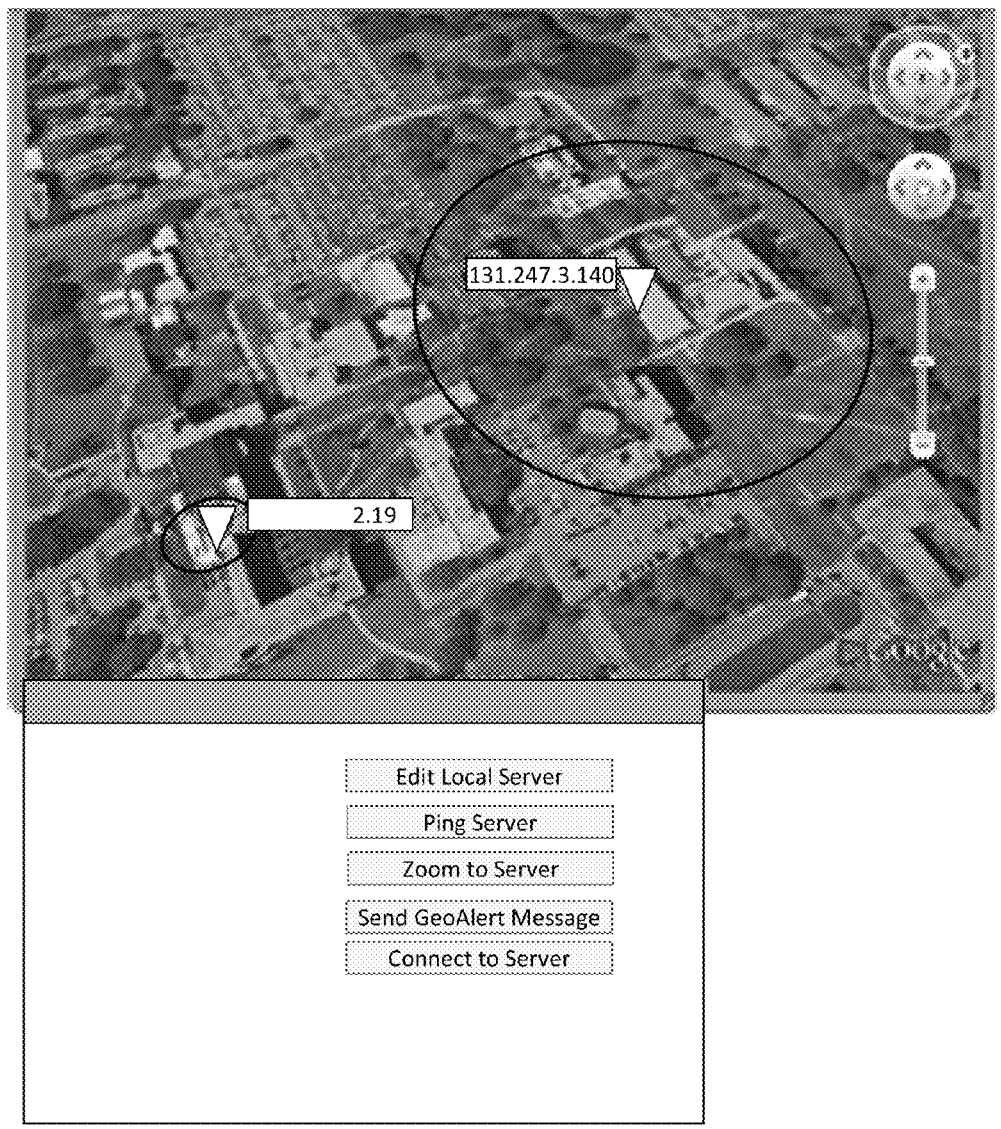

DISTRIBUTED AND DECENTRALIZED LOCATION AWARE ARCHITECTURE

CROSS REFERENCE TO RELATED APPLICATIONS

This application claims priority to U.S. Provisional Patent Application 61/228,376, filed Jul. 24, 2009, which is herein incorporated by reference.

FIELD OF INVENTION

This invention relates to a location-based services (LBS); more specifically the decentralization of LBS systems.

SUMMARY

This invention includes system-wide scalability of massive location-aware systems. In the past, location based services (LBS) systems traditionally consist of one server controlling a series of field client devices in the same geography.

The present invention allows the LBS system to have many of these servers and shows the network of servers in a single view from where to send ALERT messages to other servers (and their clients) and also zoom in to see the internal network of a particular server. This new network of servers has been implemented using a distributed protocol.

The present invention includes a distributed and decentralized location-aware system. The system includes a number of peers (e.g. LBS servers). Each of the plurality of peers is in communication with the other peers. Each of the plurality of peers is also adapted to communicate a PING message, a PONG message, and an ALERT message. Each of the messages has a header that includes location information.

The location information may include latitude and longitude data of the peer or the covering distance of the respective peer.

The peers may also have peer tables. Peer tables include a list of a peer's peers that are online.

Each peer may be in communication with one or more field clients. The covering distance of the peer will expand and contract according to the distance of the field client located farthest from the peer.

Also included is a method of communication between two peers in a distributed location-aware system. The method begins by transmitting a PING message from the first peer to the second peer. The PING message includes a header and a payload. The header of the PING message includes location information and the payload indicates the listening port of the first peer. In response to the PING message, the second peer transmits a PONG message back to the first peer. The PONG message includes a header having location information and a payload indicating the listening port of the second peer, the number of field clients connected to the second peer, and the last message received from the first peer. The first peer transmits an ALERT message to the second peer. The ALERT message includes a header having location information and a payload including an alert message.

The location information may include latitude and longitude data of the peer or the covering distance of the respective peer.

Another method of communication in a distributed location-aware system is also included. Here, a peer transmits a PING message. The PING message has a header and a payload. The header contains location information and the payload indicates the peer's listening port. The peer then receives a PONG message. The PONG message also has a header and a payload. The header contains location information and the payload indicates the listening port of another peer, the number of field clients connected to the other peer, and the last message received by the other peer from the original peer. The peer then transmits an ALERT message. The ALERT message includes a header a payload. The header contains location information and the payload includes the alert message.

The location information may include latitude and longitude data of the peer or the covering distance of the respective peer.

In addition, the present invention includes a method of rendering a distributed location-aware system. In the method a communication link between an electronic map and a number of peers is provided. The location information and the covering distance of each of the peers is obtained and used to plot the location and render the covering distance of each peer on the electric map. A communication link between an electronic control device, such a computer or a smart phone, and the electronic map is provided.

The method may further include receiving a selection of a peer-of-interest and changing the viewing perspective of the electronic map according to the location of the peer-of-interest. This allows a user to view the network of peers from the perspective of the peer-of-interest even when the user is remotely located. In some embodiments, the electronic map is a web-based electronic map, such a Google® Earth. The covering distance may be the area covered by a circle having the location information as the center and a radius given by the distance of the farthest client connected to the peer.

BRIEF DESCRIPTION OF THE DRAWINGS

For a fuller understanding of the invention, reference should be made to the following detailed description, taken in connection with the accompanying drawings, in which:

THE FIGURE is a screen shot of a web interface showing the overlay network of LBS servers in accordance with an embodiment of the present invention.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention includes a protocol that interconnects several location-based services (LBS) servers. This allows for the scaling and decentralization of LBS systems. The main idea is that field clients are assigned to a particular LBS server and the server represents a group of users to be tracked in some geographical area. Because several (or many) servers could be installed in many different places, a way to create a complete picture of the entire system of servers while not over utilizing the communication lines and the servers was needed. To provide this complete visualization, a decentralized system architecture where all these servers are interconnected and a new communication protocol so they can exchange the required information was created. The visualization can be displayed on any electronic map. Ideally, the electronic is a web-based electronic map, such as a Google® Earth map. The visualization includes a map of the location, the interconnection of all of the servers, and the area that each server is currently tracking. By selecting a desired server through the visualization, the system can connect the desired server and visualize that particular system as if the control station were in that particular place. The connectivity among servers has been developed by a novel protocol, which is described below.

The novel protocol interconnects LBS servers, which may also be referred to herein as peers. To facilitate this, the message headers of the protocol contain location information.

There are three classes of messages in the protocol, which are referred to herein as PING, PONG, and ALERT messages. The first two types of messages, PING and PONG, keep the state of the system and the last peer to broadcast a geographically aware ALERT. The system also provides reliability on the messages by asking a receiving peer to acknowledge a message that has been sent to it. This is because the implementation of the messages uses an unreliable transport layer protocol (e.g. UDP).

Message Header

The message header of the protocol contains the location (latitude, longitude) of the peer that sends a message. An exemplary header is shown in Table 1 below. The fields of the header are described in Table 2 below.

TABLE 1

Protocol Header

| | messid | payload type | time to live | traversed hops | payload size | flags | lat | lng | covdist |
|---|---|---|---|---|---|---|---|---|---|
| byte | 0-7 | 8-11 | 12-15 | 16-19 | 20-23 | 24-27 | 28-35 | 36-43 | 44-52 |

TABLE 2

Header Field Descriptions

| Field Name | Description |
|---|---|
| messid | This is the message ID of the header. Each header sent by a peer has a unique message ID. This number is a long integer and is generated using the timestamp in milliseconds of when it was generated. |
| payloadtype | This field identifies the type of message: PING message, PONG message, or ALERT message |
| timetolive | This field identifies the total number of hops the message can traverse before being discarded. When a message is received and it has to be forwarded to another peer, this value is decremented. When a message arrives with this field having a zero (0) value, the message is discarded. |
| traversedhops | The number of peers a message has traversed. |
| flags | This field is used to provide a certain quality of service to the message. In this system, there are two services, which are a reliable and an unreliable delivery. A value of zero ('0') in this field indicates that the message does not need to be confirmed for delivery. (unreliable service) A value of one ('1') indicates that the message has to be acknowledged. (reliable service) A value of two ('2') indicates that the message received is an acknowledgment and the payload of the message is the ID of the message to be acknowledged. |
| lat | This field identifies the latitude of the peer sending the message. |
| lng | This field identifies the longitude of the peer sending the message. |
| covdistance | This field identifies the covering distance of the peer sending the message. The covering distance of a peer is defined as the distance of the farthest field client connected to the peer. |

PING Message

A PING message sent by a peer initializes a node in the peer network through a node discovery process. A PING message also serves as a keep alive message for indicating that the node sending the PING is active.

A PING message is responded to by a PONG message. An initial PING message is defined by the header and a payload of four bytes that indicates the port the peer sending the message uses for listening for responses. The PING message sets the payload type field of the header to zero ('0'), the time to live field to one ('1'), and the traversed hops to zero ('0').

PONG Message

A PONG message is sent by a peer upon receipt of a PING message. A PONG message contains information about a peer currently connected to the overlay network. A PONG message sets the payload type field of the header to one ('1'), the time to live field to one ('1'), and the traversed hops to 0.

An exemplary PONG message is shown in Table 3 below. The fields of a PONG message are described in Table 4 below.

TABLE 3

PONG Message

| | port | ipaddress | active_ses | lat | lng | covdist | last_update |
|---|---|---|---|---|---|---|---|
| byte | 0-3 | 4-7 | 8-11 | 12-19 | 20-27 | 28-35 | 35-42 |

TABLE 4

PONG Message Field Descriptions

| Field Name | Description |
|---|---|
| port | The listening port of a peer connected in the overlay. |
| Ipaddress | The ip address of the peer in the overlay. |
| active_ses | The number of active fieldclient sessions that are connected to that peer. |
| lat | Latitude of the peer. |
| lng | Longitude of the peer. |
| covdist | The covering distance of the peer (it is defined the same was as for the PING). |
| last_update | This field identifies the last message received from this particular peer. When a peer receives the PONG message, it updates its table only if this field is newer than the last information received from/about the peer the PONG message represents. This field is the header id of the last message received from the peer represented by this particular PONG. |

ALERT Message

The ALERT message delivers geographically localized messages. An ALERT message sets the flag of the header to one ('1'), indicating that this is a message that must be acknowledged. An exemplary ALERT message is shown in Table 5 below. The fields of an ALERT message are described in Table 6 below.

TABLE 5

ALERT Message

| | messid | lat | lng | covdist | mes_size | message |
|---|---|---|---|---|---|---|
| byte | 0-3 | 4-7 | 8-11 | 12-19 | 20-27 | 28-35 |

TABLE 6

ALERT Message Field Descriptions

| Field Name | Description |
| --- | --- |
| messid | This field identifies an ALERT message. It is the timestamp in milliseconds when the message was generated. |
| lat | Latitude of the center of the area where the geographically located message is sent. |
| lng | Longitude of the center of the area where the geographically located message is sent. |
| covdist | The radius of the geographically located message. The (lat, lng) and the covdist define a circumference where all of the field clients that are within the server's control are located and must be notified. |
| mes_size | The length of the message sent. A message must have at least one character and less than 1000 characters. |
| message | The contents of the ALERT message. |

Exemplary Protocol Implementation

In an exemplary embodiment, the novel protocol was implemented using UDP as the transport layer protocol.

The protocol keeps a fully connected topology that is maintained by enforcing peers to send messages at most once every forty-five seconds. Suppose Peer A has Peer B in its peer table. If no messages from Peer B are received by Peer A in forty-five seconds, Peer A issues a PING message to Peer B and waits for a response. If no PONG response is received in the next twenty seconds, Peer A deletes Peer B from its peer table.

When an ALERT message needs to be sent, the system performs a geographical query over its peer list. The ALERT message is then sent to those peers that comply with one or more of the two following conditions:

(1) If it lies within the area of the ALERT message, or
(2) If the area of the ALERT message overlaps some of the area of a peer. This is calculated by adding the radius of the message to the covering radius of the peer. If the peer lies within a circle having a center with the same coordinate of the ALERT message and a radius equal to the summation of the radius of the message and the covering distance, then the peer is notified.

Once each of the selected peers receives the ALERT message, they execute intraALERT procedures, which send the message to all a peer's field client devices. The system allows any control station (computer) connected to the Internet to connect to any of the servers. Once connected to one particular server, the system displays the overlay network, or the network of servers in the electronic map (e.g. a Google Earth map), each peer in its respective real location, including the area each covers. The area covered by each peer is shown as a circumference centered at the server and having a radius equal to the distance of the user located the farthest from the peer. From this map interface, several functions can be performed, as shown in THE FIGURE, and explained in Table 7 below.

TABLE 7

Interface Functions

| Function | Description |
| --- | --- |
| Edit Local Server: | Allows the user to edit the location of the local server (the server the user is currently connected to). |
| Ping Server | Issues a PING message to connect and discover peers. Once the peer is added to the peer list, its location and current covering area are shown in the map interface. |
| Zoom to Server | Zooms to a server chosen from the active server list. This option changes the map interface and brings the interface that the user of the control station of that particular server would see locally. |
| Send GeoAlert | Issues a geographically located ALERT message. |
| Connect to Server | Opens a new window and connects to the map interface (login window) of the selected server from the active server list. |

THE FIGURE shows two peers in the system. There are two circumferences that describe the current covering area of each of the peers. In the FIGURE, peer 131.247.3.140 has a greater area than the other peer. This is because there is at least one user that is within that area. This area contracts and expands as field clients that are connected to that particular peer move.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A distributed and decentralized location-aware system, comprising:
    a plurality of peers;
    a first peer of the plurality of peers adapted to transmit a PING message to a second peer of the plurality of peers, wherein the PING message includes an application layer header having location information, a covering distance and a payload indicating the listening port of the first peer, wherein the covering distance is the area covered by a circle having a center given by the location information and a radius given by the distance of a farthest field client connected to the first peer;
    the second peer adapted to transmit a PONG message to the first peer, in response to receipt of the PING message at the second peer, wherein the PONG message includes an application layer header having location information, a covering distance and a payload indicating the listening port of the second peer, the number of field clients connected to the second peer and the last message received from the first peer, wherein the covering distance is the area covered by a circle having a center given by the location information and a radius given by the distance of a farthest field client connected to the second peer, and the second peer further adapted to transmit a PING message to a third peer, wherein the PING message includes an application layer header having location information, a covering distance and a payload indicating the listening port of the second peer, wherein the covering distance is the area covered by a circle having a center given by the location information and a radius given by the distance of a farthest field client connected to the second peer;
    the third peer adapted to transmit a PONG message to the second peer, in response to receipt of the PING message at the third peer, wherein the PONG messages includes an application layer header having location information, a covering distance and a payload indicating the listening port of the third peer, the number of field clients connected to the third peer, and the last message received from the second peer, wherein the covering distance is the area covered by a circle having a center given by the location information and a radius given by the distance of a farthest field client connected to the third peer;

the first peer further adapted to transmit an ALERT message from the first peer to the second peer, wherein the ALERT message includes an application layer header having location information a covering distance and a payload including an alert message, wherein an ALERT coverage area is defined by the area covered by a circle having a center given by the location information and a radius equal to covering distance of the ALERT message, wherein the first peer is adapted to transmit the ALERT message to the second peer if the second peer is within the ALERT message coverage area or if the covering distance of the second peer overlaps with the ALERT message coverage area; and the second peer adapted to transmit the ALERT message from the second peer to the third peer if the third peer is within the covering distance of the second peer.

2. The system of claim 1, wherein the location information includes the latitude and longitude of the peer.

3. The system of claim 1, wherein each of the plurality of peers have a peer table, the peer table including a list of peers that are online.

4. The system of claim 1, further comprising, a field client in communication with one of the plurality of peers.

5. A method of communication between a first peer, a second peer and a third peer in a distributed location-aware system, the method comprising:

transmitting a PING message from the first peer to the second peer, wherein the PING message includes an application layer header having location information, a covering distance and a payload indicating the listening port of the first peer, wherein the covering distance is the area covered by a circle having a center given by the location information and a radius given by the distance of a farthest field client connected to the first peer;

transmitting a PONG message from the second peer to the first peer, in response to receipt of the PING message at the second peer, wherein the PONG messages includes an application layer header having location information, a covering distance and a payload indicating the listening port of the second peer, the number of field clients connected to the second peer, and the last message received from the first peer, wherein the covering distance is the area covered by a circle having a center given by the location information and a radius given by the distance of a farthest field client connected to the second peer;

transmitting a PING message from the second peer to the third peer, wherein the PING message includes an application layer header having location information, a covering distance and a payload indication the listening port of the second peer, wherein the covering distance is the area covered by a circle having a center given by the location information and a radius given by the distance of a farthest field client connected to the second peer;

transmitting a PONG message from the third peer to the second peer, in response to receipt of the PING message at the third peer, wherein the PONG messages includes an application layer header having location information, a covering distance and a payload indicating the listening port of the third peer, the number of field clients connected to the third peer, and the last message received from the first peer, wherein the covering distance is the area covered by a circle having a center given by the location information and a radius given by the distance of a farthest field client connected to the third peer;

transmitting an ALERT message from the first peer to the second peer, wherein the ALERT message includes an application layer header having location information, a covering distance and a payload including an alert message, wherein an ALERT coverage area is defined by the area covered by a circle having a center given by the location information and a radius equal to the covering distance of the ALERT message, wherein the ALERT message is transmitted to the second peer if the second peer is within the ALERT message coverage area or if the covering distance of the second peer overlaps with the ALERT message coverage area; and transmitting the ALERT message from the second peer to the third peer if the third peer is within the covering distance of the second peer.

6. The method of claim 5, wherein the location information includes the latitude and longitude of the peer.

7. A method of communication in a distributed location-aware system comprising:

transmitting, from a first peer, a PING message including an application layer header having location information, a covering distance and a payload indicating a listening port of the first peer, wherein the covering distance is the area covered by a circle having a center given by the location information and a radius given by the distance of a farthest field client connected to the first peer;

receiving, at the first peer, a PONG message including an application layer header having location information, a covering distance and a payload indicating the listening port of a second peer, the number of field clients connected to the second peer, and the last message received by the second peer from the first peer, wherein the covering distance is the area covered by a circle having a center given by the location information and a radius given by the distance of a farthest field client connected to the second peer;

transmitting, from the second peer, a PING message including an application layer header having location information, a covering distance and a payload indicating a listening port of the second peer, wherein the covering distance is the area covered by a circle having a center given by the location information and a radius given by the distance of a farthest field client connected to the second peer;

receiving, at the second peer, a PONG message including an application layer header having location information, a covering distance and a payload indicating the listening port of a third peer, the number of field clients connected to the third peer, and the last message received by the second peer from the third peer, wherein the covering distance is the area covered by a circle having a center given by the location information and a radius given by the distance of a farthest field client connected to the second peer;

transmitting an ALERT message, from the first peer to the second peer, wherein the ALERT message includes an application layer header having location information, a covering distance and a payload including an alert message, wherein an ALERT coverage area is defined by the area covered by a circle having a center given by the location information and a radius equal to the covering distance of the ALERT message, wherein the ALERT message is transmitted to the second peer if the second peer is within the ALERT message coverage area or if the covering distance of the second peer at least partially overlaps with the ALERT message coverage area; and transmitting the ALERT message from the second peer to the third peer if the third peer is within the covering distance of the second peer.

8. The method of claim 7, wherein the location information includes the latitude and longitude of the peer.

9. The system of claim 1, wherein the covering distance of the other plurality of peers overlaps with the ALERT message coverage area if the peer lies within a circle having a center equal to the ALERT message location information and a radius equal to the summation of the radius of the ALERT message and the radius given by the distance of the farthest field client connected to the peer.

10. The method of claim 5, wherein the covering distance of the second peer overlaps with the ALERT message coverage area if the second peer lies within a circle having a center equal to the ALERT message location information and a radius equal to the summation of the radius of the ALERT message and the radius given by the distance of the farthest field client connected to the second peer.

11. The method of claim 7, wherein the covering distance of the second peer overlaps with the ALERT message coverage area if the second peer lies within a circle having a center equal to the ALERT message location information and a radius equal to the summation of the radius of the ALERT message and the radius given by the distance of the farthest field client connected to the second peer.

* * * * *

UNITED STATES PATENT AND TRADEMARK OFFICE
CERTIFICATE OF CORRECTION

PATENT NO. : 8,924,536 B1
APPLICATION NO. : 12/843143
DATED : December 30, 2014
INVENTOR(S) : Sean Barbeau et al.

It is certified that error appears in the above-identified patent and that said Letters Patent is hereby corrected as shown below:

In the Claims

Column 7, Claim 5, Line 60 should read:

-- ering distance and a payload indicating the listening port --.

Signed and Sealed this
Twenty-fifth Day of August, 2015

Michelle K. Lee
*Director of the United States Patent and Trademark Office*